United States Patent
Sakimoto et al.

(10) Patent No.: US 9,425,677 B2
(45) Date of Patent: Aug. 23, 2016

(54) GRID-INTERCONNECTED POWER CONVERTER

(71) Applicant: KAWASAKI JUKOGYO KABUSHIKI KAISHA, Kobe-shi, Hyogo (JP)

(72) Inventors: Kenichi Sakimoto, Akashi (JP); Kazushige Sugimoto, Amagasaki (JP); Yuji Shindo, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/771,373

(22) PCT Filed: Oct. 18, 2013

(86) PCT No.: PCT/JP2013/006190
§ 371 (c)(1),
(2) Date: Aug. 28, 2015

(87) PCT Pub. No.: WO2014/132304
PCT Pub. Date: Sep. 4, 2014

(65) Prior Publication Data
US 2016/0006338 A1    Jan. 7, 2016

(30) Foreign Application Priority Data

Feb. 28, 2013    (JP) .................................. 2013-039647

(51) Int. Cl.
*G05F 3/06*     (2006.01)
*H02M 7/757*    (2006.01)
(Continued)

(52) U.S. Cl.
CPC ............... *H02M 1/00* (2013.01); *H02M 7/539* (2013.01); *H02M 7/53875* (2013.01);
(Continued)

(58) Field of Classification Search
CPC ............ H02M 2001/0009; H02M 2001/0019; H02M 2001/325; H02M 7/53873; H02M 7/525; H02M 7/527; H02M 7/529; H02M 7/53; H02M 7/5395; H02M 1/081–1/083; H02M 1/088; H02M 1/096; H02M 1/31; H02M 2007/4822
USPC ......... 363/35, 37, 40–43, 56.01, 56.1, 56.11, 363/75, 79, 97
See application file for complete search history.

(56) References Cited

U.S. PATENT DOCUMENTS 4,451,771 A * 5/1984 Nagase .................. H02P 27/048
                                              318/799
4,862,343 A * 8/1989 Nomura .................. H02P 21/36
                                              318/802

(Continued)

FOREIGN PATENT DOCUMENTS

JP    2009-081942 A    4/2009
JP    2009-225599 A    10/2009

(Continued)

*Primary Examiner* — Adolf Berhane
*Assistant Examiner* — Gary Nash
(74) *Attorney, Agent, or Firm* — Oliff PLC

(57) ABSTRACT

A power converter that includes: a power conversion unit; and a control unit configured to control the power conversion unit such that the power conversion unit operates as a virtual synchronous generator. The control unit includes: an AVR model unit; a governor and driving source model unit; a power generation torque arithmetic operation unit; a rotation angle arithmetic operation unit; a voltage d-q conversion unit; and a generator model unit configured to perform arithmetic operation.

4 Claims, 11 Drawing Sheets

(51) Int. Cl.

| | | |
|---|---|---|
| *H02M 5/42* | (2006.01) | |
| *H02M 7/68* | (2006.01) | |
| *H02M 3/24* | (2006.01) | |
| *H02M 7/44* | (2006.01) | |
| *H02M 1/00* | (2006.01) | |
| *H02M 7/5387* | (2007.01) | |
| *H02M 7/539* | (2006.01) | |
| *H02J 3/38* | (2006.01) | |

(52) U.S. Cl.
CPC ............... *H02J 3/381* (2013.01); *H02J 3/383* (2013.01); *H02J 3/387* (2013.01); *H02J 2003/388* (2013.01); *H02M 2001/0009* (2013.01); *Y02E 10/563* (2013.01)

(56) References Cited

U.S. PATENT DOCUMENTS

| | | | | |
|---|---|---|---|---|
| 6,528,966 B2* | 3/2003 | Na | ........................ | H02P 21/30 318/609 |
| 7,034,493 B2* | 4/2006 | Yoshimoto | .............. | H02P 21/06 318/629 |
| 7,084,604 B2* | 8/2006 | Salomaki | ................ | H02P 21/13 318/767 |
| 2002/0190672 A1* | 12/2002 | Karikomi | .......... | H02M 7/53873 318/139 |
| 2005/0002210 A1* | 1/2005 | Moon | ..................... | B60L 11/14 363/37 |
| 2006/0049792 A1* | 3/2006 | Chen | ....................... | H02P 21/50 318/716 |
| 2010/0060222 A1* | 3/2010 | Kezobo | ................. | G01R 31/42 318/490 |
| 2011/0227515 A1* | 9/2011 | Imura | ................ | H02P 21/0003 318/400.01 |

FOREIGN PATENT DOCUMENTS

| | | |
|---|---|---|
| JP | 2011-155795 A | 8/2011 |
| JP | 2012-143018 A | 7/2012 |
| JP | 2013-162623 A | 8/2013 |

* cited by examiner

GRID-INTERCONNECTED POWER CONVERTER

TECHNICAL FIELD

The present invention relates to a power converter that is used in, for example, a distributed power supply and that is interconnected with an electrical grid.

BACKGROUND ART

In recent years, power supply systems utilizing distributed power supplies, such as gas engine generators and fuel cells, are drawing increasing attention. For example, there is one proposed system that uses a power generator called a distributed power supply mentioned above to supply electric power from the power generator to a plurality of electrical loads in a particular area (see Patent Literature 1 and Patent Literature 2, for example).

It is often the case that such a system, which is also called a microgrid, is configured such that a power system therein is connected not only to the aforementioned power generator but also to an energy storage that includes, for example, a secondary battery. The energy storage is provided for compensating for fluctuations in power generation by the power generator as well as load fluctuations. There is also a case where the power system is an AC power system, but the power generator is a DC power generator. In this case, a power converter for AC-DC power conversion is necessary. In such a system where a distributed power supply is utilized, self-sustained operation in which the system is operated independently of a commercial electrical grid, and interconnected operation in which the system is operated while being interconnected with a commercial electrical grid, are both taken into consideration. It is important to realize stable power supply in both of these operations. Also, the power converter is required to have functions that make such stable power supply possible.

In view of the above, the applicant of the present application has recently developed a technique of controlling a power converter that has characteristics equivalent to those of a grid-interconnected power generator (i.e., a power converter including a generator model). The applicant has proposed a power converter that realizes: stable power supply not only in the interconnected operation but also in the self-sustained operation; and uninterrupted transition from the interconnected operation to the self-sustained operation. Patent Literature 3 discloses a power converter whose control system incorporates, as a generator model, a differential equation called Park's equation in which the dynamics of a power generator are written. Patent Literature 4 also discloses a conventional power converter. In Patent Literature 4, a generator model is represented by a phasor diagram, and thereby the dynamics of a power generator are simplified. Such a simplified generator model is incorporated in a control system of the power converter.

CITATION LIST

Patent Literature

PTL 1: Japanese Laid-Open Patent Application Publication No. 2009-081942
PTL 2: Japanese Laid-Open Patent Application Publication No. 2011-155795
PTL 3: Japanese Laid-Open Patent Application Publication No. 2009-225599
PTL 4: Japanese Laid-Open Patent Application Publication No. 2012-143018

SUMMARY OF INVENTION

Technical Problem

However, the power converter disclosed in Patent Literature 3 has a problem in that since the generator model includes a differential equation system called Park's equation for simulating an actual power generator, a control circuit or control program becomes complex.

In the power converter disclosed in Patent Literature 4, the input stage of the control system is provided with a PLL circuit for use in detecting a system frequency. However, since the PLL circuit has a control time lag, the work of determining a response time and adjustment of a time constant are necessary, requiring highly advanced expertise. Furthermore, when a variation in system voltage occurs due to a load fluctuation or system failure, since the PLL circuit is susceptible to the influence thereof, there is a case where a phenomenon similar to a step out of an actual power generator occurs in the generator model. In this case, expected continuous operation is hindered.

The present invention has been made to solve the above-described problems. An object of the present invention is to provide a power converter having characteristics equivalent to those of a power generator, the power converter not using a PLL circuit for use in detecting a system frequency and capable of continuous operation regardless of a variation in system voltage or frequency.

Solution to Problem

In order to solve the above-described problems, a power converter according to one aspect of the present invention includes: a power conversion unit configured to convert DC power inputted thereto into AC power, and output the AC power to an output line connected to a power system; and a control unit configured to control the power conversion unit such that the power conversion unit operates as a virtual synchronous generator. The control unit includes: an AVR model unit configured to perform arithmetic operation, based on reactive power and an output voltage that are outputted from the power conversion unit to the output line, a reactive power command value, and a voltage command value, to obtain an induced voltage of the virtual synchronous generator in accordance with a deviation of the output voltage from the voltage command value; a governor and driving source model unit configured to perform arithmetic operation, based on active power outputted from the power conversion unit to the output line, an active power command value, an angular velocity command value, and an angular velocity of a rotor of the virtual synchronous generator, to obtain a driving torque of a virtual driving source in accordance with a deviation of the angular velocity from the angular velocity command value, the virtual driving source driving the virtual synchronous generator; a power generation torque arithmetic operation unit configured to perform arithmetic operation, based on the induced voltage obtained through the arithmetic operation by the AVR model unit and either a q-axis current command value or a q-axis component of an output current of the power conversion unit, to obtain a power generation torque of the virtual synchronous generator; a rotation angle arithmetic operation unit configured to perform arithmetic operation to obtain an acceleration torque of the rotor of the virtual synchronous generator in a manner to subtract the power generation torque obtained through the arithmetic operation by the power generation torque arithmetic operation unit from the driving torque obtained through the arithmetic operation by the governor and driving source model unit, and perform arithmetic operation based on at least the acceleration torque and inertia of the rotor of the virtual synchronous generator to obtain the angular velocity and a rotation angle of the rotor of the virtual synchronous generator; a voltage d-q conversion unit configured to perform arithmetic operation, with use of the rotation angle obtained through the arithmetic operation by the rotation angle arithmetic operation unit, to obtain a d-axis component and a q-axis component of an output voltage of the power conversion unit; a generator model unit configured to perform arithmetic operation, with use of an algebraic expression that is specified by a phasor diagram representing a relationship among an induced voltage, a phase voltage, and a line current of a synchronous generator, and based on the induced voltage obtained through the arithmetic operation by the AVR model unit and the d-axis component and the q-axis component of the output voltage obtained through the arithmetic operation by the d-q conversion unit, to obtain a d-axis current command value and the q-axis current command value corresponding to a d-axis component and a q-axis component of an armature current of the virtual synchronous generator; and a power conversion control unit configured to control the power conversion unit to output a current corresponding to the d-axis current command value and the q-axis current command value obtained through the arithmetic operation by the generator model unit. In a case where a transformer is present on the output line, the meaning of the terms "output voltage of the power conversion unit" and "output current of the power conversion unit" herein include not only a voltage and a current at the primary side of the transformer, but also a voltage and a current at the secondary side of the transformer. The reason for this is that the voltage and the current at the secondary side of the transformer are merely a result of conversion of a voltage value and a current value of electric power directly outputted from the power conversion unit, the conversion being performed in accordance with the winding number ratio between the primary winding and the secondary winding. The wording "perform arithmetic operation" includes the meaning of "perform calculation" by software and the meaning of "perform analogue arithmetic operation" by hardware (e.g., an electronic circuit).

According to this configuration, characteristics equivalent to those of a power generator are realized by the generator model unit, which models a steady state of the virtual synchronous generator by using a phasor diagram. As a result, the control system of the power converter is simplified. The governor and driving source model unit performs arithmetic operation to obtain the driving torque of the virtual driving source in accordance with a frequency deviation (i.e., a deviation of the angular velocity of the rotor of the virtual synchronous generator). The power generation torque arithmetic operation unit performs arithmetic operation to obtain the power generation torque of the virtual synchronous generator in accordance with a load current (i.e., the q-axis current command value or the q-axis component of the output current). The rotation angle arithmetic operation unit performs arithmetic operation to obtain the acceleration torque of the rotor of the virtual synchronous generator in a manner to subtract the power generation torque from the driving torque. Then, the generator model performs arithmetic operation, based on the d-axis component and the q-axis component of the output voltage, which are calculated by using the rotation angle, and the induced voltage obtained through the arithmetic operation by the AVR model unit, to obtain a q-axis current command value that causes a load current corresponding to the rotation angle to be outputted. Therefore, for example, if the rotation angle of the rotor of the virtual synchronous generator increases due to any external disturbance, then the q-axis current command value increases, accordingly. This causes an increase in power generation torque and decrease in acceleration torque of the virtual synchronous generator. Consequently, the rotation angle of the rotor of the virtual synchronous generator decreases. Thus, even if an external disturbance has occurred, the virtual synchronous generator tends to maintain a certain rotation angle of the rotor. That is, in the control unit, synchronizing power is exerted in a manner similar to that of a synchronous generator. Thus, even if a phase variation has occurred in the power system, the rotation angle of the rotor of the virtual synchronous generator can be caused to follow the phase of the voltage of the power system owing to the synchronizing power. This makes continuous operation possible even without a PLL circuit.

The control unit may further include a power generation torque damping unit configured to damp a vibration of the power generation torque obtained through the arithmetic operation by the power generation torque arithmetic operation unit, and output the power generation torque to the rotation angle arithmetic operation unit.

According to this configuration, virtual damping winding of a synchronous generator is realized in the virtual synchronous generator. Therefore, oscillation of the rotor of the virtual synchronous generator is reduced, and thus a damping effect can be obtained. The damping unit may be configured as a filter or a phase lead compensator, for example.

The control unit may further include a voltage limiting unit configured to limit values of the d-axis component and the q-axis component of the output voltage, which are fed to the generator model unit via the voltage d-q conversion unit, to predetermined values.

According to this configuration, even if the system voltage (output voltage) has varied greatly, parameter values of the virtual synchronous generator are prevented from varying greatly to deviate from a range within which a power generator operates stably. This makes it possible to avoid the occurrence of a step out and makes continuous operation possible. The limiting of the output voltage may be performed either before or after d-q conversion.

The control unit may further include a current limiting control unit configured to perform control to limit the d-axis and q-axis current command values obtained through the arithmetic operation by the generator model to be within a predetermined range.

According to this configuration, even if a phenomenon occurs, in which the current at the time of voltage variation becomes greater than the current in a steady state, the capacity of the power converter will not be exceeded. This makes continuous operation with no operation stop possible.

Advantageous Effects of Invention

The present invention makes it possible to provide a power converter having characteristics equivalent to those of a power generator, the power converter not using a PLL circuit for use in detecting a system frequency and capable of continuous operation regardless of a variation in system voltage or frequency.

The above object, other objects, features, and advantages of the present invention will be made clear by the following detailed description of preferred embodiments with reference to the accompanying drawings.

DESCRIPTION OF EMBODIMENTS

Figure 1:
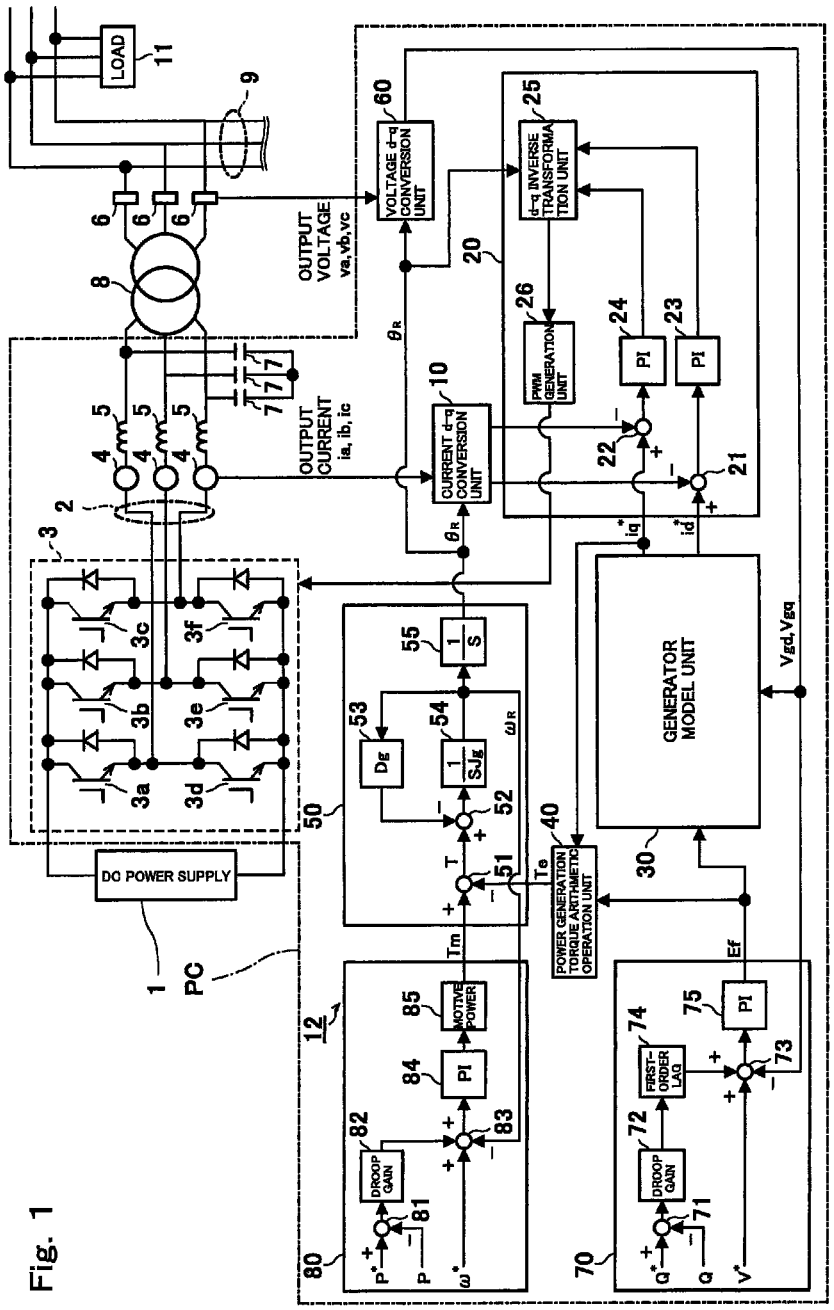
FIG. 1 is block diagram showing an example of the configuration of a microgrid in which a power converter according to Embodiment 1 of the present invention is used.

Hereinafter, embodiments of the present invention are described with reference to the drawings. In the drawings, the same or corresponding elements are denoted by the same reference signs, and repeating the same descriptions is avoided below.

Embodiment 1

Configuration

FIG. 1 is a block diagram showing an example of the configuration of a microgrid in which a power converter according to Embodiment 1 of the present invention is used.

As shown in FIG. 1, a load 11 and a DC power supply 1 are connected to a power distribution line (AC electrical path) 9 of a microgrid (small-scale power distribution network). The DC power supply 1 is connected to the power distribution line 9 via a power converter PC and an output line 2. Examples of the DC power supply 1 include a DC power generator and a secondary battery. Examples of the DC power generator include a solar cell, a fuel cell, and an AC power generator including a rectifier (e.g., a gas turbine generator or an engine generator). The DC power supply 1 and the power converter PC form an AC power supply device. A microgrid controller (not shown) that performs integral management of the microgrid is installed in the area of the microgrid based on settings made by a business operator operating the microgrid. The AC power supply device and the load 11 connected to the power distribution line 9 of the microgrid are provided with respective monitoring units monitoring them (e.g., electric power measurement devices: not shown). Each monitoring unit can communicate with the microgrid controller via, for example, a signal line (not shown). The microgrid controller receives a monitored state (measurement value) from each monitoring unit, and in accordance with each monitored state, transmits a command value to the AC power supply device, such as an output power target value. Such command values are preset (i.e., preprogrammed) by the business operator, such that the command values are determined in accordance with the monitored states from the monitoring units.

The microgrid may be in a mode in which the microgrid is operated independently of a commercial electrical grid (a large-scale electrical grid) without being interconnected therewith (hereinafter, this mode is referred to as an "independent mode") or in a mode in which the microgrid is operated while being interconnected with a commercial electrical grid (hereinafter, this mode is referred to as an "interconnected mode"). In the case of the interconnected mode, the power distribution line 9 of the microgrid is connected to the commercial electrical grid via, for example, a breaker (not shown). At the time, the power converter PC of the AC power supply device performs interconnected operation.

While the microgrid is in the interconnected mode, if, for example, an abnormality has occurred in the commercial electrical grid, then the breaker is opened and thereby the microgrid is in the same state as in the independent mode. Opening and closing of the breaker are controlled by, for example, a control system (not shown) of the commercial electrical grid. At the time, based on changes in the frequency and voltage of the output line, the power converter PC of the AC power supply device detects a state of independent operation, and opens a switch (not shown) to shift to self-sustained operation. Hereinafter, unless it is mentioned that the microgrid is in the independent mode, it is assumed that the microgrid is operated in the interconnected mode, and the power converter PC is performing interconnected operation.

The AC power supply device is connected to the power distribution line 9 of the microgrid via a transformer 8. The power converter PC according to the present embodiment forms the AC power supply device together with the DC power supply 1. The power converter PC herein includes: a power conversion unit 3 configured to convert input DC power into AC power, and output the AC power to the output line 2, which is connected to a power system; current sensors (current measuring PCs) 4 configured to detect three-phase (phase a, phase b, phase c) output currents ia, ib, ic outputted from the power conversion unit 3; output reactors 5; and voltage sensors (voltage measuring PTs) 6 configured to detect output voltages va, vb, vc of the respective phases (phase a, phase b, phase c); filter capacitors 7; and a control unit 12 configured to control the power conversion unit 3. It should be noted that in order to control the microgrid, the power converter PC may be provided with a voltage sensor (not shown) detecting the voltage of the DC power supply 1. The number of phases of each of the distribution line 9 and the output line 2 is not limited. Each voltage sensor (voltage measuring PT) 6 herein detects a voltage at the secondary side of the transformer 8. However, as an alternative, the voltage sensor 6 may detect a voltage at the primary side.

For example, the power conversion unit 3 is formed by six switching elements 3a to 3f, to each of which a diode is connected in an antiparallel manner. The power conversion unit 3 is formed by semiconductor elements. For example, IGBTs are used as the switching elements 3a to 3f. The control unit 12 outputs, to the power conversion unit 3, a control signal (PWM signal) to be inputted to a control terminal of each of the switching elements 3a to 3f (e.g., to the gate terminal of each of the IGBTs) to turn on or off each of the switching elements 3a to 3f, thereby causing the power conversion unit 3 to function as an inverter.

The control unit 12 is configured to control the power conversion unit 3 such that the power conversion unit 3 operates as a virtual synchronous generator. In other words, the virtual synchronous generator is assumed to include: a power generator; an AVR (automatic voltage regulator) configured to control an induced voltage of the power generator; a driving source driving the power generator; and a governor. The control unit 12 includes a generator model unit 30, an AVR model unit 70, and a governor and driving source model unit 80. The generator model unit 30 defines an input/output relationship of the assumed power generator. The AVR model unit 70 defines an input/output relationship of the assumed AVR. The governor and driving source model unit 80 defines an input/output relationship of the assumed driving source and governor. Specifically, the generator model unit 30 is an arithmetic operation unit configured to perform arithmetic operation to obtain an output in response to an input to the power generator. The AVR model unit 70 is an arithmetic operation unit configured to perform arithmetic operation to obtain an output in response to an input to the AVR. The governor and driving source model unit 80 is an arithmetic operation unit configured to perform arithmetic operation to obtain an output in response to inputs to the driving source and the governor. Further, in the present embodiment, the control unit 12 includes: a power generation torque arithmetic operation unit 40 configured to calculate a power generation torque $T_e$ of the virtual synchronous generator; a rotation angle arithmetic operation unit 50 configured to calculate, for example, a rotation angle $\theta_R$ of a rotor of the virtual synchronous generator; a voltage d-q conversion unit 60 configured to calculate a d-axis component $V_{gd}$ and a q-axis component $V_{gq}$ of the output voltage of the power conversion unit 3; a current d-q conversion unit 10 configured to calculate a d-axis component and a q-axis component of the output current of the power conversion unit 3; and a power conversion control unit 20 configured to control the power conversion unit 3 to output a current corresponding to a current command value calculated by the virtual synchronous generator. The meaning of the terms "output voltage of the power conversion unit 3" and "output current of the power conversion unit 3" herein include not only a voltage and a current at the primary side of the transformer 8 present on the output line 2, but also a voltage and a current at the secondary side of the transformer 8.

The control unit is configured as, for example, an arithmetic operation device such as an FPGA (field programmable gate array), a PLC (programmable logic controller), or a microcontroller. The generator model unit 30, the power conversion control unit 20, and the like are function blocks, which are realized when the arithmetic operation device executes a program stored therein.

Next, the configuration of the control unit 12 is described in detail. It should be noted that, in the description below, an adder, a subtracter, and an adder-subtracter are each simply referred to as an adder-subtracter.

The control unit 12 includes the generator model unit 30, the AVR model unit 70, the governor and driving source model unit 80, the power generation torque arithmetic operation unit 40, the rotation angle arithmetic operation unit 50, the current d-q conversion unit 10, the voltage d-q conversion unit 60, and in addition, a power detection unit, etc., which are not shown. For example, the power detection unit receives the output currents ia, ib, ic detected by the current sensors 4 and the output voltages va, vb, vc detected by the voltage sensors 6, and calculates active power P and reactive power Q from these output currents and voltages. The power detection unit outputs the calculated active power P to the governor and driving source model unit 80, and outputs the calculated reactive power Q to the AVR model unit 70. It should be noted that the power detection unit may detect the active power by means of, for example, a power meter provided on the output line 2.

Based on active power P outputted from the power conversion unit 3 to the output line 2, an active power command value P*, an angular velocity command value ω*, and an angular velocity $\omega_R$ of the rotor of the virtual synchronous generator, the governor and driving source model unit 80 calculates (by performing arithmetic operation) a driving torque $T_m$ of a virtual driving source in accordance with a deviation of the active power P from the active power command value P* and a deviation of the angular velocity $\omega_R$ from the angular velocity command value ω*, the virtual driving source driving the virtual synchronous generator. Specifically, the active power command value P* and the angular velocity command value ω* are inputted to the governor and driving source model unit 80 from outside (in this example, from the microgrid controller). In addition, the active power P is inputted from the power detection unit, and the angular velocity $\omega_R$ is inputted from the rotation angle arithmetic operation unit 50, which will be described below. An adder-subtracter 81 outputs, to a droop block 82, a value obtained by subtracting the active power P from the active power command value P*. The droop block 82 outputs, to an adder-subtracter 83, a value that is obtained by performing predetermined arithmetic operation on the output from the adder-subtracter 81 in accordance with drooping characteristics of the governor (e.g., a value obtained by multiplying the output from the adder-subtracter 81 by a gain $K_{gd}$, which is a real constant). The adder-subtracter 83 outputs, to a PI control block 84, a value that is obtained by subtracting the angular velocity $\omega_R$ from the sum of the angular velocity command value ω* and the output value of the droop block 82. The PI control block 84 performs proportional-integral compensation on the output from the adder-subtracter 83 by means of, for example, a PI regulator. The PI control block 84 is a simulated response lag of the governor and the driving source. It should be noted that, alternatively, the PI control block 84 may only perform proportional compensation. A driving torque output unit 85 converts the output from the PI control block 84 into a driving torque $T_m$ of the virtual driving source (e.g., a gas turbine) (for example, by multiplying the output by a predetermined coefficient), and outputs the driving torque $T_m$ to the rotation angle arithmetic operation unit 50.

The rotation angle arithmetic operation unit 50 subtracts the power generation torque $T_e$ calculated by the power generation torque arithmetic operation unit 40 from the driving torque $T_m$ calculated by the governor and driving source model unit 80, thereby calculating an acceleration torque T of the rotor of the virtual synchronous generator. Based on at least the acceleration torque T and the inertia of the rotor of the virtual synchronous generator, the rotation angle arithmetic operation unit 50 calculates the angular velocity $\omega_R$ and the rotation angle $\theta_R$ of the rotor of the virtual synchronous generator.

Specifically, adder-subtracters 51 and 52 subtract the power generation torque $T_e$ inputted from the power generation torque arithmetic operation unit 40 and a friction torque inputted from a damping block 53 from the driving torque $T_m$, and outputs a value obtained from the subtraction to a unit inertia constant block 54. The unit inertia constant block 54 performs predetermined arithmetic processing by using the output from the adder-subtracter 52 and a unit inertia constant $J_g$ simulating the inertia of the rotor, thereby calculating the angular velocity $\omega_R$ of the rotor of the virtual synchronous generator, and outputs the calculated angular velocity $\omega_R$ to an integrator 55, the adder-subtracter 83, and the damping block 53. The damping block 53 performs predetermined arithmetic operation by using the angular velocity $\omega_R$ of the rotor and a damper coefficient $D_g$ simulating the kinetic friction of the rotor, thereby calculating a friction torque, and outputs the calculated friction torque to the adder-subtracter 52. It should be noted that in the case of simplifying the arithmetic operation of calculating the angular velocity $\omega_R$ of the rotor, the damping block 53 may be eliminated. The integrator 55 integrates the inputted rotor angular velocity $\omega_R$ to calculate the rotation angle $\theta_R$ of the rotor of the virtual synchronous generator, and outputs the rotation angle $\theta_R$ to the voltage d-q conversion unit 60, the current d-q conversion unit 10, and a d-q inverse transformation unit 25.

Based on reactive power Q and an output voltage $V_g$ outputted from the power conversion unit 3 to the output line 2, a reactive power command value Q*, and a voltage command value V*, the AVR model unit 70 calculates an induced voltage $E_f$ of the virtual synchronous generator in accordance with a deviation of the reactive power Q from the reactive power command value Q* and a deviation of the output voltage $V_g$ from the voltage command value V*.

Specifically, the reactive power command value Q* and the voltage command value V* are inputted to the AVR model unit 70 from outside (in this example, from the microgrid controller). In addition, the reactive power Q is inputted from the power detection unit, and an effective voltage $V_g$ is inputted from an effective voltage arithmetic operation unit (not shown). The effective voltage arithmetic operation unit herein calculates the effective voltage $V_g$ from $V_{gq}$ and $V_{gd}$ calculated by the voltage d-q conversion unit 60, by using an equation below.

[Math. 1]

$$V_g = \sqrt{V_{gq}^2 + V_{gd}^2} \qquad (1)$$

The power detection unit calculates the reactive power Q from $V_{gq}$, $V_{gd}$ and $i_q$, $i_d$ by using an equation below.

[Math. 2]

$$Q = V_{gq} i_d - V_{gd} i_q \qquad (2)$$

It should be noted that $V_{gq}$, $V_{gd}$ and $i_q$, $i_d$ in the equations (1) and (2) are calculated in a manner that will be described below.

An adder-subtracter 71 outputs, to a droop block 72, a value that is obtained by subtracting the reactive power Q from the reactive power command value Q* (i.e., a reactive power deviation). The droop block 72 outputs, to a block 74, a value that is obtained by performing predetermined arithmetic operation on the output from the adder-subtracter 71 in accordance with drooping characteristics of the AVR (e.g., a value obtained by multiplying the output from the adder-subtracter 71 by a gain $K_{ad}$, which is a real constant). The block 74 imparts a first-order lag to the output from the droop block 72, and outputs a resulting value to an adder-subtracter 73. The reason for imparting the first-order lag is to prevent a response to the reactive power deviation from being sensitive. Meanwhile, the voltage command value V* is inputted to the adder-subtracter 73. The adder-subtracter 73 sums the output from the block 74 and the voltage command value V*, then subtracts the effective voltage $V_g$ from the value of the sum, and outputs a resulting value (i.e., a voltage deviation incorporating the reactive power deviation) to a PI control block 75. The PI control block 75 performs proportional-integral compensation on the output from the adder-subtracter 73 by means of, for example, a PI regulator to calculate the induced voltage $E_f$, and outputs the calculated induced voltage $E_f$ to the generator model unit 30 and the power generation torque arithmetic operation unit 40.

Based on the induced voltage $E_f$ calculated by the AVR model unit 70 and the d-axis component $V_{gd}$ and the q-axis component $V_{gq}$ of the output voltage calculated by the voltage d-q conversion unit 60, the generator model unit 30 calculates a d-axis current command value $i_d$* and a q-axis current command value $i_q$* corresponding to the d-axis component and the q-axis component of an armature current of the virtual synchronous generator. The generator model unit 30 simulates asynchronous generator by using an algebraic expression specified by a phasor diagram. Hereinafter, a specific description of the generator model unit 30 according to the present embodiment is given.

Figure 2:
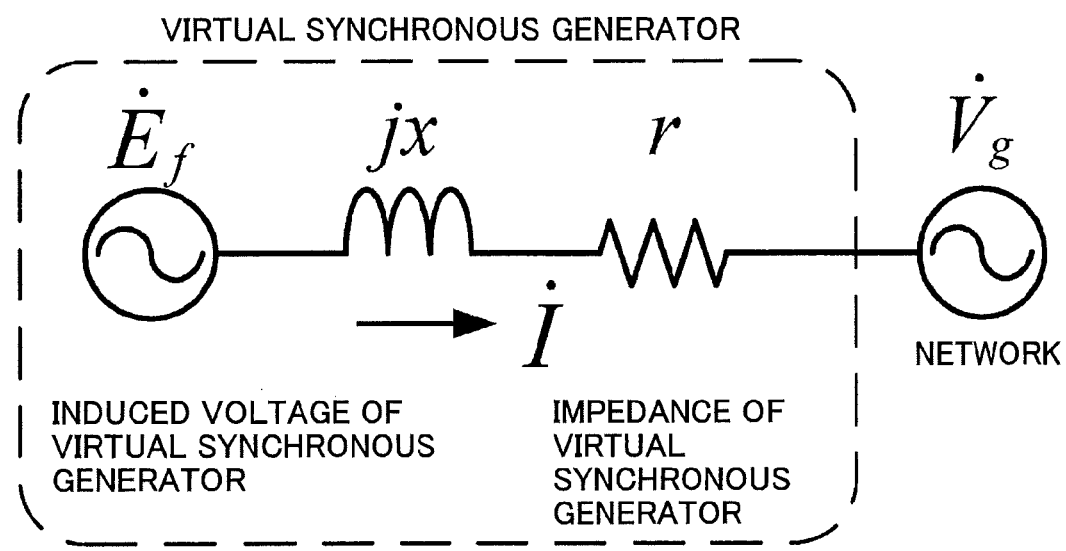
FIG. 2 is an equivalent circuit of a modeled virtual synchronous generator included in a control unit of the power converter of FIG. 1.

FIG. 2 is an equivalent circuit of a modeled virtual synchronous generator included in the control unit 12 of the power converter of FIG. 1. As shown in the equivalent circuit of FIG. 2, the virtual synchronous generator is modeled by using: the induced voltage $E_f$, which is generated by a field magnet of the virtual synchronous generator; an impedance of the virtual synchronous generator based on a winding reactance x and a winding resistance r of a virtual armature of the virtual synchronous generator; and a voltage $V_g$ (complex voltage vector) and a current I (complex current vector) outputted from the virtual synchronous generator.

Figure 3:
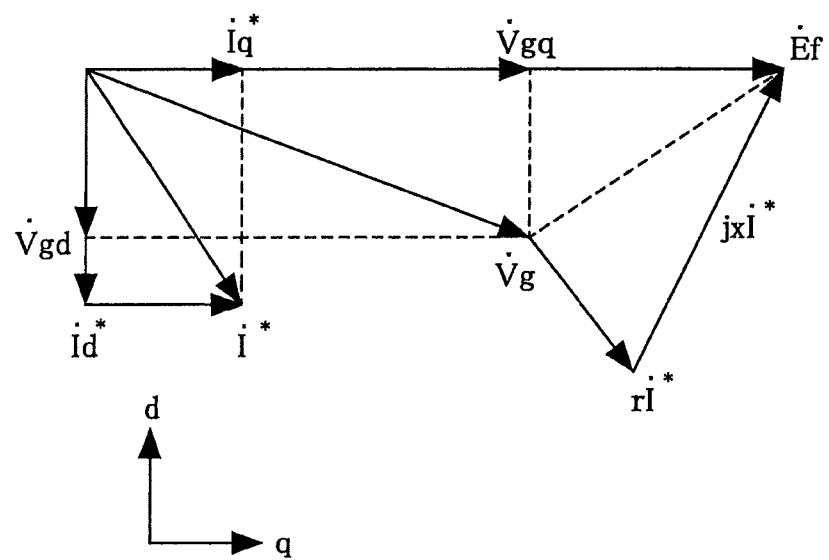
FIG. 3 is a phasor diagram representing a relationship among an induced voltage, a phase voltage, and a line current in the equivalent circuit of the virtual synchronous generator of FIG. 2.

FIG. 3 is a phasor diagram representing a relationship among an induced voltage, a phase voltage (output voltage), and a line current (output current (to be exact, a current command value)) in the equivalent circuit of the virtual synchronous generator of FIG. 2. In the phasor diagram, the induced voltage $E_f$ is a reference vector of the q-axis. Based on the phasor diagram shown in FIG. 3, a relationship among complex vectors is represented as shown below.

[Math. 3]

$$\dot{E}_f = E_f$$

$$\dot{V}_g = V_{gq} + jV_{gd}$$

$$\dot{I}^* = I^*_q + jI^*_d \qquad (3)$$

[Math. 4]

$$\dot{E}_f - \dot{V}_g = (E_f - V_{gq}) - jV_{gd}$$

$$\dot{E}_f - \dot{V}_g = (r + jx)(I^*_q + jI^*_d)$$

$$(E_f - V_{gq}) - jV_{gd} = (rI^*_q - xI^*_d) + j(rI^*_d + xI^*_q) \qquad (4)$$

In the equations (4), real parts are equal to each other, and imaginary parts are equal to each other. Therefore, equations below hold true.

[Math. 5]

$$\begin{bmatrix} E_f - V_{gq} \\ -V_{gd} \end{bmatrix} = \begin{bmatrix} r & -x \\ x & r \end{bmatrix} \begin{bmatrix} I^*_q \\ I^*_d \end{bmatrix} \qquad (5)$$

$$\begin{bmatrix} I^*_q \\ I^*_d \end{bmatrix} = \frac{1}{r^2 + x^2} \begin{bmatrix} r & x \\ -x & r \end{bmatrix} \begin{bmatrix} E_f - V_{gq} \\ -V_{gd} \end{bmatrix}$$

Figure 4:
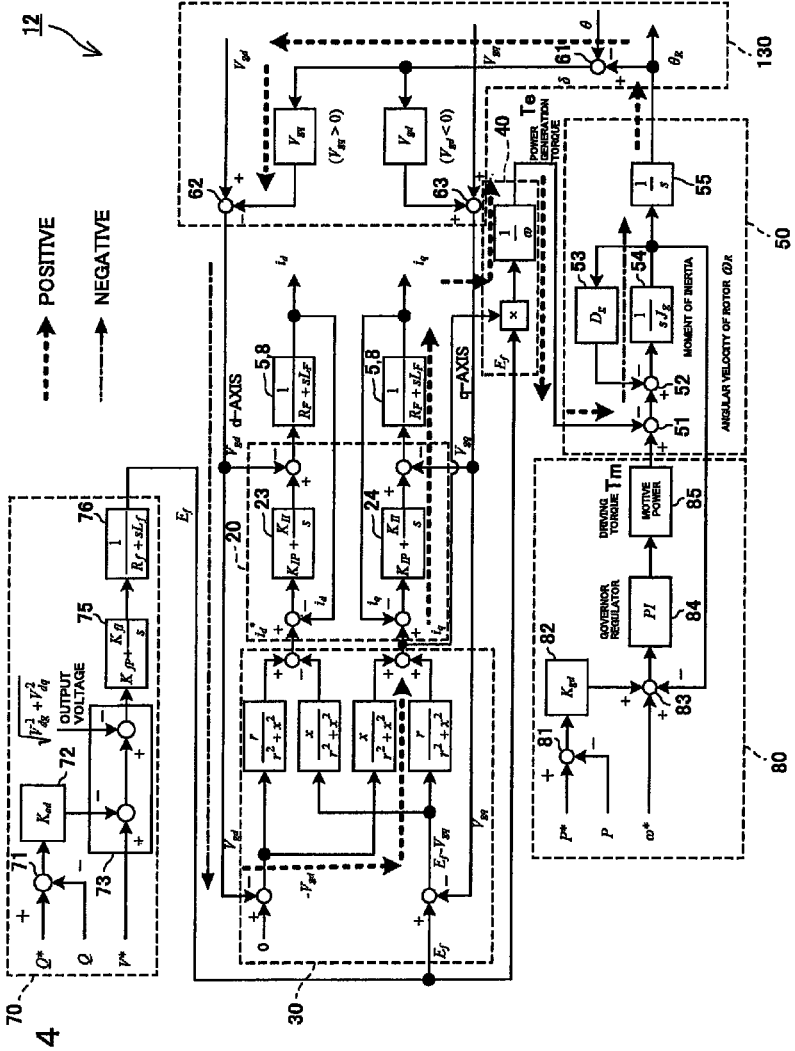
FIG. 4 is an equivalent block diagram when the control unit of the power converter of FIG. 1 performs control.

Hereinafter, the control unit 12 of the power converter PC is described by also referring to an equivalent block diagram of FIG. 4. FIG. 4 is an equivalent block diagram when the control unit 12 of the power converter PC performs control. It should be noted that FIG. 4 shows an example of a specific configuration of each block of FIG. 1 and an equivalent circuit 130 of a feedback path for feeding back a variation occurring in the rotation angle $\theta_R$ of the rotor of the virtual synchronous generator. The equivalent circuit 130 will be described below together with the operation of the power converter PC.

The algebraic expression (5) is represented by a control block, such as a block 30 in the block diagram of FIG. 4. This control block means that when the induced voltage $E_f$ and output voltage vectors $V_{gq}$ and $V_{gd}$ of the virtual synchronous generator are given, command values (the d-axis current command value $i_d^*$ and the q-axis current command value $i_q$) of current feedback control of a current-type inverter (the power conversion unit 3) can be calculated. Accordingly, in the present embodiment, the generator model unit 30 is configured as a control model that performs arithmetic operation to obtain the command values of the current feedback control by using the algebraic expression (5) specified by the phasor diagram of FIG. 3. Specifically, the algebraic expression (5) specifies a relationship among the induced voltage $E_f$ of the synchronous generator, the d-axis component $V_{gd}$ and the q-axis component $V_{gq}$ of the output voltage, the d-axis current command value $i_d^*$ and the q-axis current command value $i_q^*$, and the winding reactance x and the winding resistance r of the virtual armature of the virtual synchronous generator. When the induced voltage $E_f$ and the d-axis component $V_{gd}$ and the q-axis component $V_{gq}$ of the output voltage are inputted, the generator model unit 30 calculates the d-axis current command value $i_d^*$ and the q-axis current command value $i_q^*$ that satisfy the algebraic expression (5).

The power generation torque arithmetic operation unit 40 calculates the power generation torque $T_e$ of the virtual synchronous generator based on the induced voltage $E_f$ calculated by the AVR model unit 70 and the q-axis current command value $i_q^*$. Specifically, as shown in the equivalent block diagram of FIG. 4, the power generation torque arithmetic operation unit 40 performs arithmetic operation using an equation shown below to obtain the power generation torque $T_e$. It should be noted that, in the equation below, ω represents a time differential value of a system voltage rotation angle θ. In the present embodiment, ω is a value set in advance.

$$T_e = (E_f/\omega) \times i_q^* \quad (6)$$

The power generation torque $T_e$ of the virtual synchronous generator calculated in this manner is outputted to the rotation angle arithmetic operation unit 50 as described above, and used by the rotation angle arithmetic operation unit 50 for calculating the acceleration torque T of the rotor of the virtual synchronous generator. It should be noted that a current value used in the equation (6) for calculating the power generation torque $T_e$ may be a q-axis component $i_q$ of the output current of the power conversion unit 3.

The va, vb, and vc of the output voltage of the power conversion unit 3, which are detected by the voltage sensors 6, are inputted to the voltage d-q conversion unit 60. The voltage d-q conversion unit 60 calculates the d-axis component $V_{gd}$ and the q-axis component $V_{gq}$ of the output voltage by using the rotation angle $\theta_R$ of the rotor of the virtual synchronous generator, which is calculated by the rotation angle arithmetic operation unit 50. The ia, ib, and ic of the output current of the power conversion unit 3, which are detected by the current sensors 4, are inputted to the current d-q conversion unit 10. The current d-q conversion unit 10 calculates a d-axis component $i_d$ and the q-axis component $i_q$ of the output current by using the rotation angle $\theta_R$ of the rotor of the virtual synchronous generator, which is calculated by the rotation angle arithmetic operation unit 50. Specifically, the voltage d-q conversion unit 60 and the current d-q conversion unit 10 calculate $V_{gd}$, $V_{gq}$ and $i_q$, $i_d$, respectively, by using equations shown below.

[Math. 6]

$$\begin{bmatrix} v_{g0} \\ v_{gd} \\ v_{gq} \end{bmatrix} = A_{0dq} \begin{bmatrix} v_a \\ v_b \\ v_c \end{bmatrix}, \quad (7)$$

$$\begin{bmatrix} i_0 \\ i_d \\ i_q \end{bmatrix} = A_{0dq} \begin{bmatrix} i_a \\ i_b \\ i_c \end{bmatrix}$$

$$A_{0dq} = \sqrt{\frac{2}{3}} \begin{bmatrix} 1/\sqrt{2} & 1/\sqrt{2} & 1/\sqrt{2} \\ \cos\theta_R & \cos(\theta_R - 2\pi/3) & \cos(\theta_R - 4\pi/3) \\ \sin\theta_R & \sin(\theta_R - 2\pi/3) & \sin(\theta_R - 4\pi/3) \end{bmatrix}$$

It should be noted that va, vb, vc and ia, ib, ic represent the output voltage and the output current of the power conversion unit 3, and $v_{g0}$ and $i_0$ are not used in arithmetic operation in the present embodiment.

In this manner, the arithmetic operation using the equations (7) is performed to calculate the d-axis component $V_{gd}$ and the q-axis component $V_{gq}$ of the output voltage and the d-axis component $i_d$ and the q-axis component $i_q$ of the output current.

Then, as described above, based on the d-axis component $V_{gd}$ and the q-axis component $V_{gq}$ of the output voltage, which are calculated by using the rotation angle $\theta_R$, and the induced voltage $E_f$ calculated by the AVR model unit 70, the generator model unit 30 calculates the d-axis current command value $i_d^*$ and the q-axis current command value $i_q^*$, such that a load current corresponding to the rotation angle $\theta_R$ is outputted.

As shown in FIG. 1, the power conversion control unit 20 controls the power conversion unit 3 to output a current that corresponds to the d-axis current command value $i_d^*$ and the q-axis current command value $i_q^*$, which are obtained through the arithmetic operation by the generator model unit 30. Specifically, the power conversion control unit 20 includes adder-subtracters 21 and 22, PI control blocks 23 and 24, the d-q inverse transformation unit 25, and a PWM generation unit 26. The adder-subtracter 21 subtracts the d-axis component $i_d$ of the output current from the d-axis current command value $i_d^*$. The d-axis component $i_d$ is inputted to the adder-subtracter 21 from the current d-q power conversion unit 10, and the d-axis current command value $i_d^*$ is inputted to the adder-subtracter 21 from the generator model unit 30. The adder-subtracter 21 outputs a d-axis error current obtained from the subtraction to the PI control block 23. The PI control block 23 performs proportional-integral compensation on the d-axis error current by means of a PI regulator, and outputs the result to the d-q inverse transformation unit 25. The adder-subtracter 22 subtracts the q-axis component $i_q$ of the output current from the q-axis current command value $i_q^*$. The q-axis component $i_q$ is inputted to the adder-subtracter 22 from the current d-q power conversion unit 10, and the q-axis current command value $i_q^*$ is inputted to the adder-subtracter 22 from the generator model unit 30. The adder-subtracter 22 outputs a q-axis error current obtained from the subtraction to the PI control block 24. The PI control block 24 performs proportional-integral compensation on the q-axis error current by means of a PI regulator, and outputs the result to the d-q inverse transformation unit 25. The d-q inverse transformation unit 25 performs d-q inverse transformation on the d-axis error current and the q-axis error current, on each of which the proportional-integral compensation has been performed, by using the rotation angle $\theta_R$ of the rotor, which is outputted from the integrator 55 of the rotation angle arithmetic operation unit 50, thereby generating a current command, and outputs the current command to the PWM generation unit 26. The PWM generation unit 26 converts the current command into a PMW control signal, and outputs the PMW control signal to the power conversion unit 3. In this manner, feedback control is performed such that the output current of the power conversion unit 3 becomes a current corresponding to the d-axis current command value $i_d^*$ and the q-axis current command value $i_q^*$, which are obtained through the arithmetic operation by the generator model unit 30.

[Operation]

Next, operations of the power converter PC configured as above are described.

<General Operation>

In the power converter PC, the control unit 12 performs arithmetic operation to obtain the rotation angle $\theta_R$ of the virtual synchronous generator in accordance with a deviation of the active power P outputted by the power conversion unit 3 from the active power command value P* and a deviation of the angular velocity $\omega_R$ of the rotor of the virtual synchronous generator from the angular velocity command value $\omega^*$. The control unit 12 also performs arithmetic operation to obtain the induced voltage $E_f$ of the virtual synchronous generator in accordance with a deviation of the reactive power Q outputted by the power conversion unit 3 from the reactive power command value Q* and a deviation of the output voltage V of the power conversion unit 2 from the voltage command value V*. Then, the control unit 12 performs arithmetic operation to obtain the current command values $i_d^*$ and $i_q^*$ in accordance with the rotation angle $\theta_R$ and the induced voltage $E_f$, and performs feedback control such that the output current of the power conversion unit 3 becomes a current corresponding to the current command values $i_d^*$ and $i_q^*$. Consequently, the output current of the power conversion unit 3 is feedback-controlled to be a current that causes the active power P, the reactive power Q, the output voltage, and the angular velocity of the output voltage to be equal to respective command values.

In this manner, characteristics equivalent to those of a power generator are realized in the power converter PC. Moreover, the generator model unit 30 models a steady state of the virtual synchronous generator by using a phasor diagram, and thereby the characteristics equivalent to those of a power generator are realized in the power converter PC. As a result, the control system of the power converter is simplified compared to a conventional complex generator model including a differential equation called Park's equation.

<Synchronizing Power>

Next, synchronizing power of the control unit 12 (virtual synchronous generator) is described with reference to the equivalent block of FIG. 4 and a phasor diagram of FIG. 5.

Figure 5:
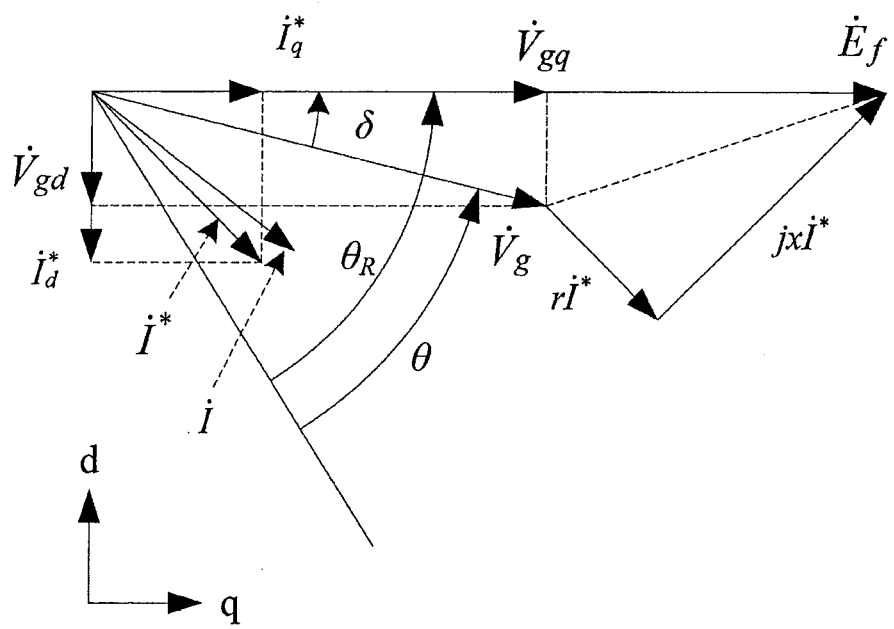
FIG. 5 is a phasor diagram representing a relationship among an induced voltage, a phase voltage, and a line current in the equivalent block diagram of FIG. 4.

FIG. 5 is a phasor diagram representing a relationship among an induced voltage, a phase voltage, and a line current (an output current and a current command value) of the virtual synchronous generator in a case where the rotation angle $\theta_R$ of the rotor has varied.

With reference to FIG. 5, 6 represents an internal phase difference angle of the virtual synchronous generator, and $\theta$ represents a rotation angle of the system voltage (output voltage). For example, assume that, during interconnection with an electrical grid, the rotation angle $\theta_R$ of the rotor of the virtual synchronous generator has increased due to any external disturbance, and consequently, the internal phase difference angle $\delta$ has increased. In this case, based on the phasor diagram of FIG. 5, $V_{gd}$ and $V_{gq}$ are represented by equations shown below.

$$V_{gq} = V_g \times \cos \delta \quad (8)$$

$$V_{gd} = -V_g \times \sin \delta \quad (9)$$

$V_{gd}$ and $V_{gq}$ in the equations (8) and (9) are represented in a manner different from, but are equivalent to, $V_{gd}$ and $V_{gq}$ calculated by the voltage d-q conversion unit 60. $V_{gd}$ and $V_{gq}$ calculated by the voltage d-q conversion unit 60 are calculated from the phase voltages va, vb, and vc by using the equations (7), and are used for actual control of the power conversion unit 3. On the other hand, $V_{gd}$ and $V_{gq}$ in the equations (8) and (9) are derived from the phasor diagram of FIG. 5, and are represented by using the internal phase difference angle $\delta$, for the purpose of describing the synchronizing power. The internal phase difference angle $\delta$ is not used for the actual control of the power conversion unit 3. Based on the equations (8) and (9), minute change components of $V_{gd}$ and $V_{gq}$ relative to a minute change in $\delta$ are represented by equations below.

[Math. 7]

$$\begin{aligned} \Delta V_{gq} &= \frac{\partial}{\partial \delta}(V_g \cos \delta) \Delta \delta \\ &= -V_g \sin \delta \cdot \Delta \delta \\ &= V_{gd} \cdot \Delta \delta \end{aligned} \quad (10)$$

$$\begin{aligned} \Delta V_{gd} &= \frac{\partial}{\partial \delta}(-V_g \sin \delta) \Delta \delta \\ &= -V_g \cos \delta \cdot \Delta \delta \\ &= -V_{gq} \cdot \Delta \delta \end{aligned}$$

Next, a description is given with reference to FIG. 4. In FIG. 4, the block 130 indicates an equivalent circuit of a feedback path for feeding back a variation occurring in the rotation angle $\theta_R$ of the rotor of the virtual synchronous generator.

A block 76 in the AVR model unit 70 is a transfer function of a field magnet coil. The response of the transfer function is slow. Accordingly, when considering the synchronizing power of the control unit 12 (virtual synchronous generator) in the equivalent block diagram of FIG. 4, the transfer function can be ignored since the influence of the field magnet coil on the synchronizing power is small.

A block (5, 8) represents a transfer function of the circuit of the output reactors 5 and the transformer 8 of FIG. 1. Here, $R_F$ and $L_F$ represent the resistance and reactance of the output reactors 5 and the transformer 8. The response speed of the power conversion control unit 20 is fast. Accordingly, when considering the synchronizing power, the transfer function can be ignored since the influence of the resistance and reactance on the synchronizing power is small. Therefore, as described above, in the equation (6) used for the arithmetic operation by the power generation torque arithmetic operation unit 40 to obtain the power generation torque $T_e$, the q-axis current command value $i_q^*$ is used.

Under normal operating conditions of the power generator, $V_{gq}$ is positive and $V_{gd}$ is negative as in the phasor diagram of FIG. 5. In FIG. 4, dotted line arrows indicate flows of positive values, and one-dot chain line arrows indicate flows of negative values. At the time, a positive power generator torque $T_e$ returns by passing along dotted line arrows in FIG. 4, causing a decrease in the angular velocity (rotation speed) $\omega_R$ of the rotor, which is calculated by the rotation angle arithmetic operation unit 50. As a result, the increase rate of $\theta_R$ is reduced, which consequently causes a decrease in δ. That is, the q-axis current command value $i_q^*$ increases, which causes an increase in power generation torque and a decrease in acceleration torque of the virtual synchronous generator. As a result, the rotation angle of the rotor of the virtual synchronous generator decreases.

Next, assume a case where $\theta_R$ has decreased and δ has decreased in accordance with the decrease in $\theta_R$. In this case, in contrast to the above-described case, the angular velocity (rotation speed) $\omega_R$ of the rotor is caused to increase. Consequently, δ is caused to increase for the same reason. Thus, even if an external disturbance has occurred, there is a tendency for δ to keep taking a certain value. Therefore, even if an external disturbance has occurred, the virtual synchronous generator tends to maintain a certain rotation angle of the rotor. That is, in the control unit 12, synchronizing power is exerted in a manner similar to that of an actual synchronous generator.

Thus, even if a phase variation has occurred in the power system, the rotation angle of the rotor of the virtual synchronous generator can be caused to follow the phase of the voltage of the power system owing to the synchronizing power. This makes continuous operation possible even without a PLL circuit.

Embodiment 2

Next, Embodiment 2 of the present invention is described with reference to FIG. 6 and FIGS. 7A and 7B. It should be noted that the description of common features between Embodiment 1 and Embodiment 2 is omitted, and only the differences from Embodiment 1 are described below.

Figure 6:
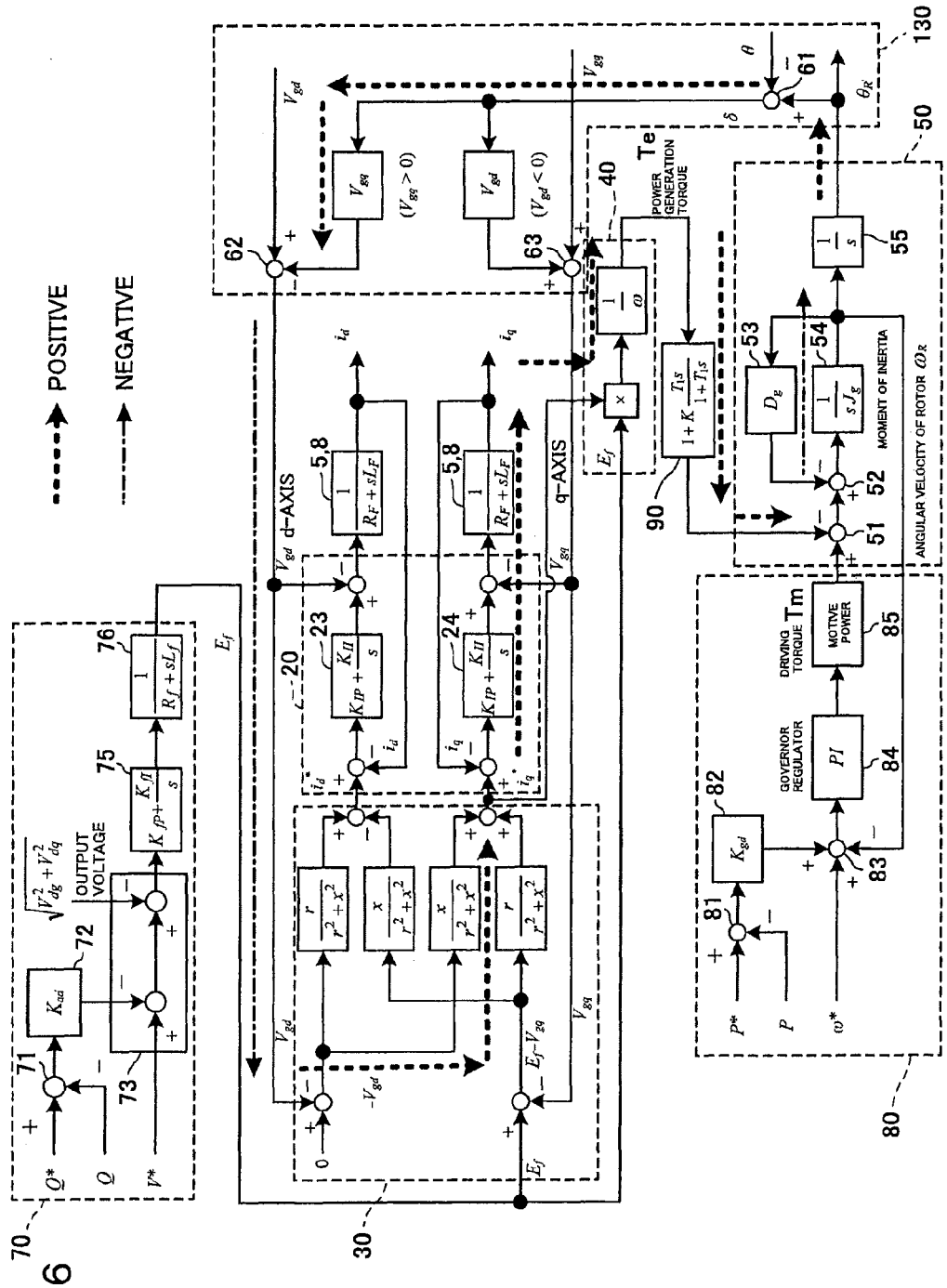
FIG. 6 is an equivalent block diagram when a control unit of a power converter according to Embodiment 2 of the present invention performs control.

FIG. 6 is an equivalent block diagram when the control unit 12 of a power converter according to Embodiment 2 of the present invention performs control. Embodiment 2 is different from Embodiment 1 in that, in Embodiment 2, the control unit 12 further includes a power generation torque damping unit 90 configured to damp the vibration of the power generation torque $T_e$ calculated by the power generation torque arithmetic operation unit 40, and output the power generation torque $T_e$ to the rotation angle arithmetic operation unit 50.

In Embodiment 1, two integrators are present on a signal transmission path and thereby a typical second-order lag system is formed, i.e., a simple harmonic motion model. On the other hand, an actual synchronous generator includes damping winding between the rotor and the stator, thereby obtaining a damping effect. In this respect, in the present embodiment, a pseudo differentiation element is added to a calculation result of the power generation torque by means of the power generation torque damping unit 90 as shown in FIG. 5. In the present embodiment, the damping unit is configured as a phase lead compensator, which is represented as shown below.

[Math. 8]

$$1 + K\frac{T_1 s}{1 + T_1 s} \tag{11}$$

Figure 7A:
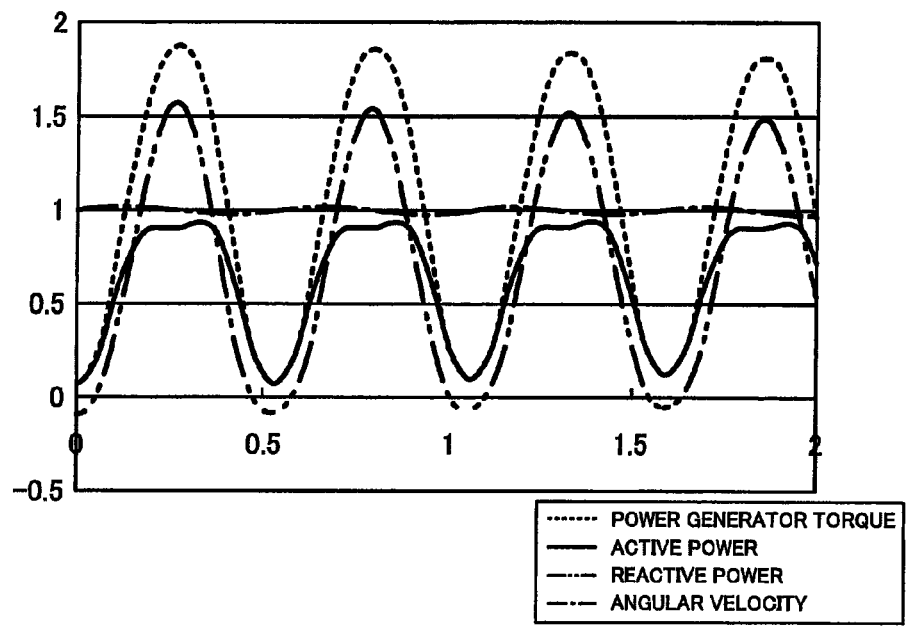
FIGS. 7A and 7B are graphs each showing results of a simulation by the power converter of FIG. 6.
Figure 7B:
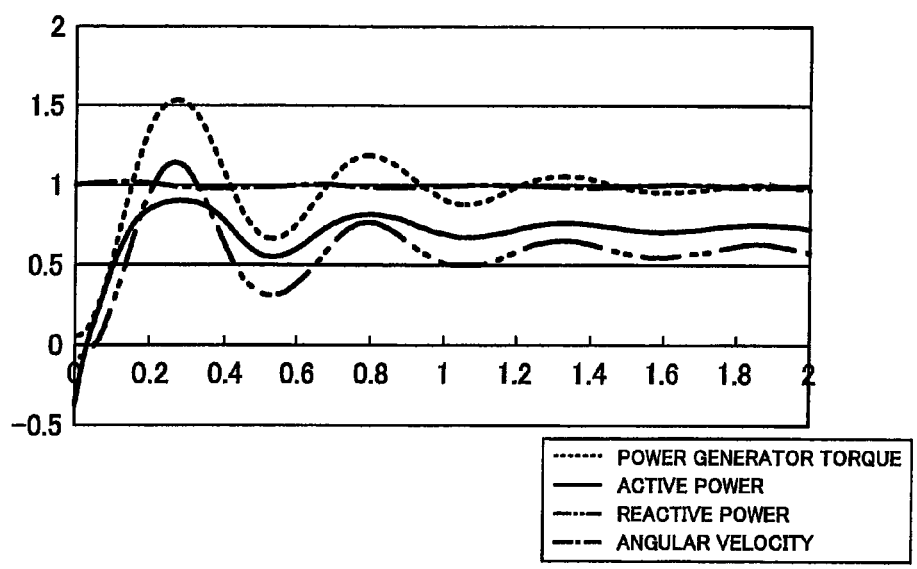

FIGS. 7A and 7B are graphs each showing results of a simulation by the power converter of the present embodiment. Each graph shows temporal changes in a power generator torque (represented by a dotted line), active power (represented by a solid line), reactive power (represented by a two-dot chain line), and an angular velocity (represented by a one-dot chain line). As a comparative example, the graph of FIG. 7A shows the results in the case of Embodiment 1, which does not include the power generation torque damping unit 90. The graph of FIG. 7B shows the results in the case of the present embodiment. As shown in FIG. 7A, in the comparative example, the vibration of the power generation torque is great; the angular velocity is not constant; and the reactive power is greater than the active power. On the other hand, in the present embodiment, as shown in FIG. 7B, the vibration of the power generation torque is damped; the angular velocity is substantially constant; and the active power is greater than the reactive power. It is clear from these simulation results that, owing to the power generation torque damping unit 90, virtual damping winding of a synchronous generator is realized in the virtual synchronous generator. Therefore, oscillation of the rotor of the virtual synchronous generator is reduced, and thus a damping effect can be obtained.

Embodiment 3

Next, Embodiment 3 of the present invention is described with reference to FIG. 8 and FIGS. 9A and 9B. It should be noted that the description of common features between Embodiment 1 and Embodiment 3 is omitted, and only the differences from Embodiment 1 are described below.

Figure 8:
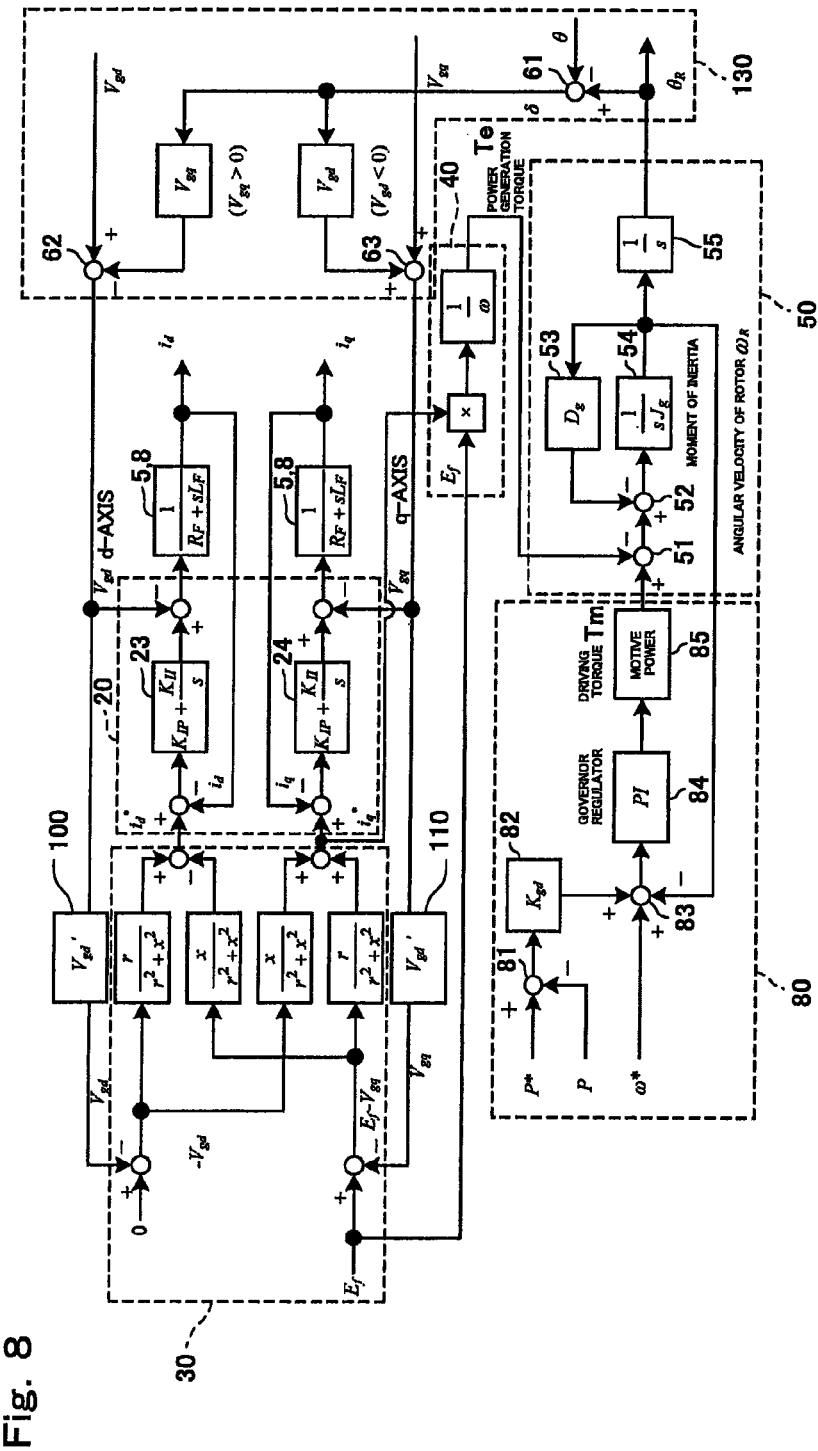
FIG. 8 is an equivalent block diagram when a control unit of a power converter according to Embodiment 3 of the present invention performs control.
Figure 9A:
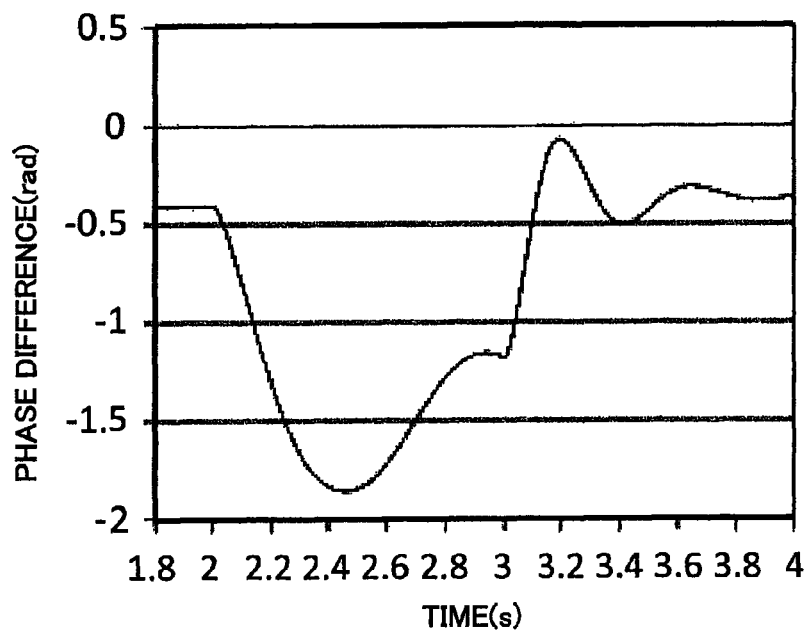
FIGS. 9A and 9B are graphs each showing results of a simulation by the power converter of FIG. 8.
Figure 9B:
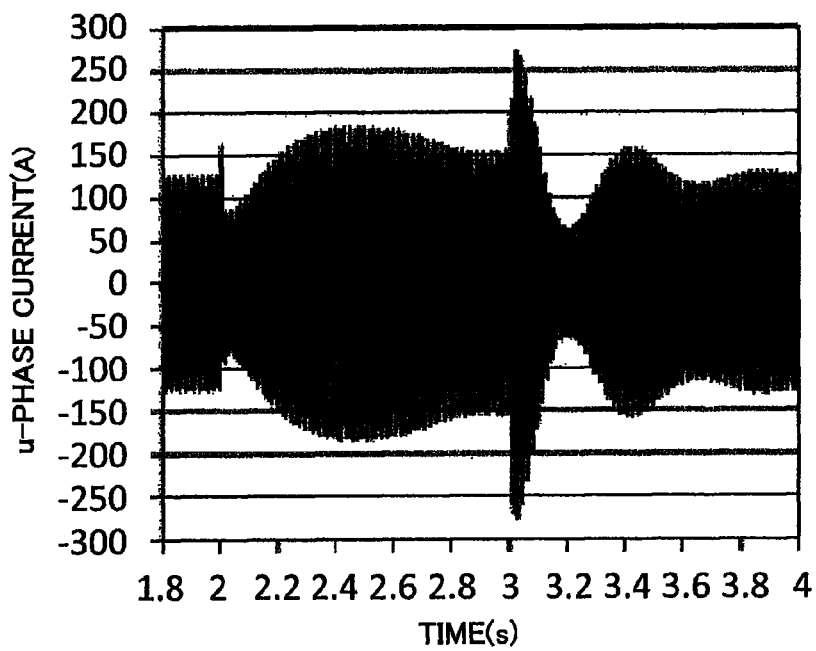

FIG. 8 is an equivalent block diagram when the control unit 12 of a power converter according to Embodiment 3 of the present invention performs control. Embodiment 3 is different from Embodiment 1 in that, in Embodiment 3, the control unit 12 further includes voltage limiting units 100 and 110 configured to limit the values of the d-axis component $V_{gd}$ and the q-axis component $V_{gq}$ of the output voltage, which are fed to the generator model unit 30 via the voltage d-q conversion unit 60, to predetermined values.

In Embodiment 1, if the system voltage varies greatly, then parameters of the virtual synchronous generator will change greatly, deviating from a range within which a power generator operates stably. As a result, a step out occurs in a manner similar to an actual power generator, becoming unable to continue operating. Therefore, in the present embodiment, a process described below is performed by means of the voltage limiting units 100 and 110. Specifically, first, it is determined whether or not a conditional expression (12) shown below holds true.

[Math. 9]

$$\sqrt{V_{gd}^2 + V_{gq}^2} < 0.9 \tag{12}$$

Next, if the conditional expression (12) holds true, the values of $V_{gd}$ and $V_{gq}$ are replaced by equations (13) and (14) shown below.

[Math. 10]

$$V'_{gq} = \frac{0.9}{\sqrt{V_{gd}^2 + V_{gq}^2}} V_{gq} \qquad (13)$$

[Math. 11]

$$V'_{gd} = \frac{0.9}{\sqrt{V_{gd}^2 + V_{gq}^2}} V_{gd} \qquad (14)$$

If the conditional expression (12) does not hold true, $V_{gd}$ and $V_{gq}$ of the voltage are not replaced ($V_{gd}'=V_{gd}$, $V_{gq}'=V_{gq}$). In this manner, regardless of an actual voltage variation value, the process is performed as if the voltage had varied by 0.9 times in the virtual synchronous generator. For example, even if the remaining voltage is 20%, parameters in the virtual synchronous generator behave as if the remaining voltage was 90%. Although in the present embodiment the voltage variation is set to 0.9 times, the voltage variation is suitably adjusted within a range not greater than 1.

The inventors of the present invention conducted a simulation using the power converter of the present embodiment. FIG. 9A is a graph showing temporal changes in phase difference, and FIG. 9B is a graph showing temporal changes in u-phase current. In the simulation, a variation in system voltage was caused to occur approximately 2.4 seconds after the start of the simulation. As shown in FIG. 9A, the phase difference diminished and became close to zero approximately 3.2 seconds after the start of the simulation owing to the synchronization function of the virtual synchronous generator. As shown in FIG. 9B, an overcurrent of the u-phase current temporarily occurred approximately 3 seconds after the start of the simulation. However, after 3.2 seconds from the start of the simulation, the u-phase current was suppressed to fall within a rated range from −150 (A) to 150 (A) owing to the effect of voltage-limiting control by the voltage limiting unit 100.

Thus, even if the system voltage (output voltage) has varied greatly, parameter values of the virtual synchronous generator are prevented from varying greatly to deviate from the range within which a power generator operates stably. This makes it possible to avoid the occurrence of a step out and makes continuous operation possible. The present embodiment adopts the above-described configuration that includes the voltage limiting units 100 and 110 corresponding to outputs from the voltage d-q conversion unit 60, and the limiting of the output voltage is performed after d-q conversion. However, an alternative configuration may be adopted, in which the limiting of the output voltage is performed before the d-q conversion.

Embodiment 4

Next, Embodiment 4 of the present invention is described with reference to FIG. 10 and FIGS. 11A and 11B. It should be noted that the description of common features between Embodiment 1 and Embodiment 4 is omitted, and only the differences from Embodiment 1 are described below.

Figure 10:
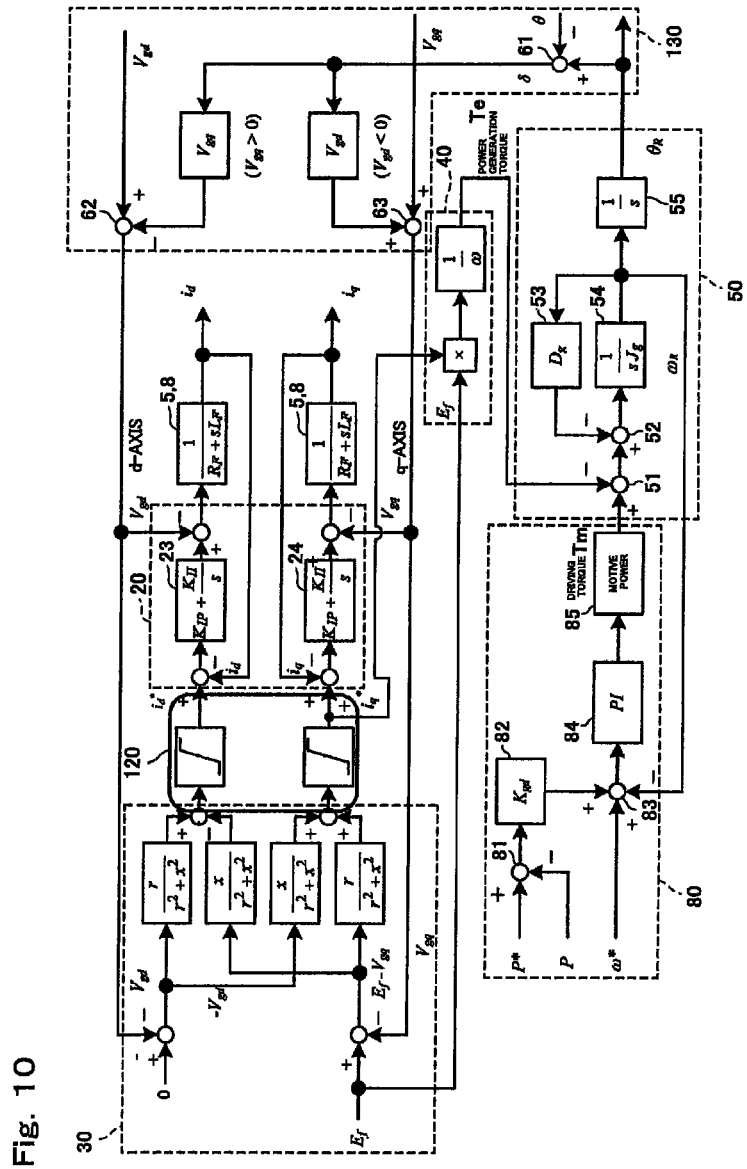
FIG. 10 is an equivalent block diagram when a control unit of a power converter according to Embodiment 4 of the present invention performs control.
Figure 11A:
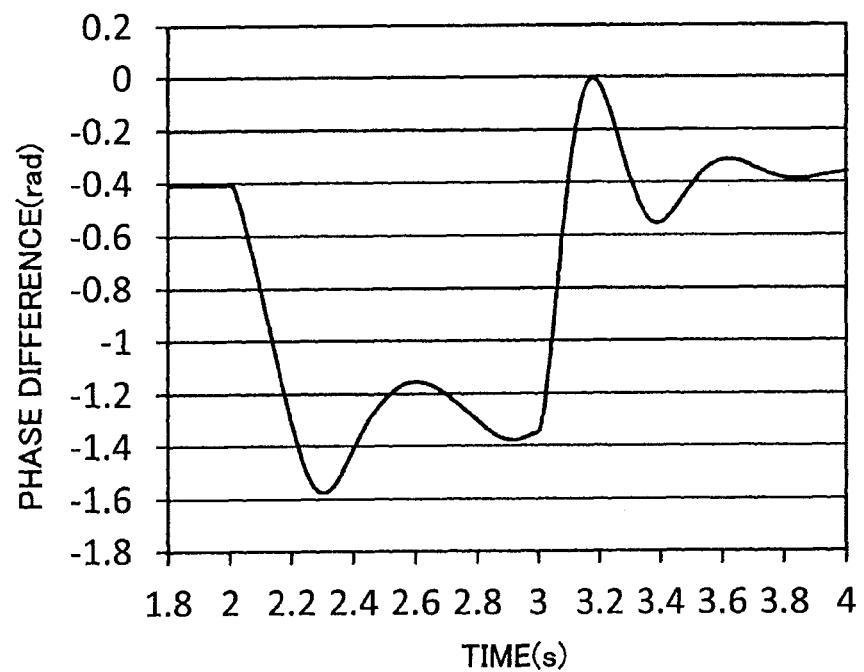
FIGS. 11A and 11B are graphs each showing results of a simulation by the power converter of FIG. 10.
Figure 11B:
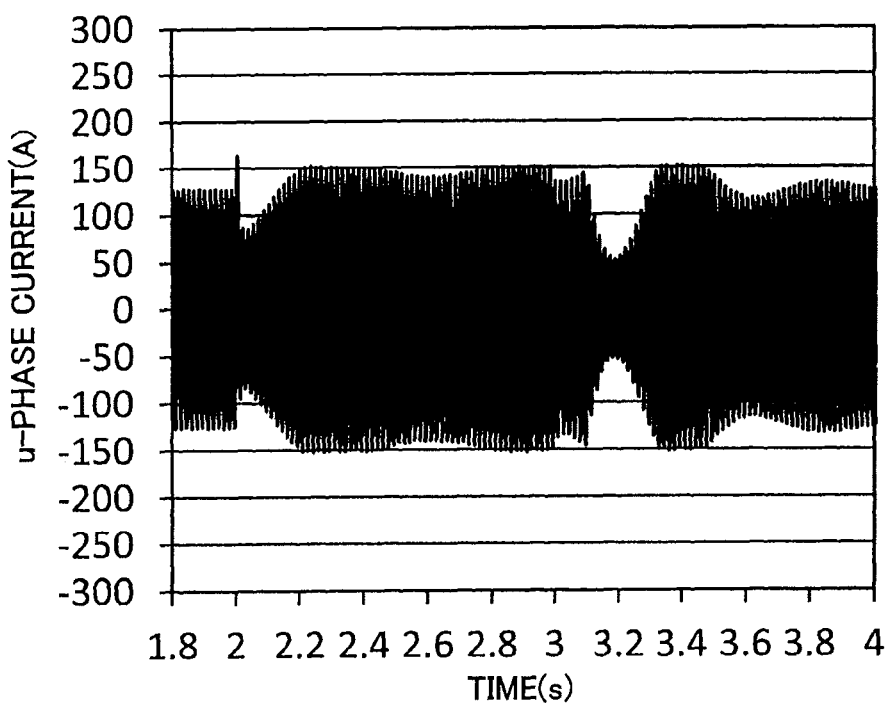

FIG. 10 is an equivalent block diagram when the control unit of a power converter according to Embodiment 4 of the present invention performs control. Embodiment 4 is different from Embodiment 1 in that, in Embodiment 4, the control unit 12 further includes a current limiting control unit 120 configured to perform control to limit the d-axis and q-axis current command values calculated by the generator model unit 30 to be within a predetermined range.

In the embodiments previously described, there is a phenomenon in which the current at the time of voltage variation becomes greater than the current in a steady state. There may be a case where this overcurrent exceeds the capacity of the power converter, rendering the power converter unable to continue operating. Therefore, in the present embodiment, as shown in FIG. 10, the current limiting control unit 120 is provided with a current limiter for limiting the current command values.

In the present embodiment, a current limit setting value for $i_d$ is in the range of −0.5 pu to 0.5 pu, and a current limit setting value for $i_q$ is in the range of −1.1 pu to 1.1 pu.

The inventors of the present invention conducted a simulation using the power converter of the present embodiment. FIG. 11A is a graph showing temporal changes in phase difference, and FIG. 11B is a graph showing temporal changes in u-phase current. In the simulation, a variation in system voltage was caused to occur approximately 2.3 seconds after the start of the simulation. As shown in FIG. 11A, the phase difference diminished and became zero approximately 3.2 seconds after the start of the simulation owing to the synchronization function of the virtual synchronous generator. In Embodiment 3 (the upper graph in FIG. 10), no current limiting is performed. Therefore, an overcurrent occurs temporarily. On the other hand, in the present embodiment, the u-phase current is in the rated range of −150 (A) to 150 (A) as shown in FIG. 11B.

According to the above configuration, even if a current greater than the current in a steady state occurs at the time of voltage variation, the capacity of the power converter will not be exceeded. This makes continuous operation with no operation stop possible.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The present invention is applicable to a power converter having an interconnected operation function of operating in a manner to interconnect with an electrical grid.

REFERENCE SIGNS LIST

PC power converter
1 secondary battery
2 voltage sensor
3 power conversion unit
4 current sensor
5 output reactor
6 voltage sensor
7 filter capacitor
8 transformer
9 power distribution line of microgrid
10 current d-q conversion unit
11 load
12 control unit
13 virtual synchronous generator
14 microgrid controller
15 breaker 16 power distribution line of commercial electrical grid
20 power conversion control unit
30 generator model unit
40 power generation torque arithmetic operation unit
50 rotation angle arithmetic operation unit
60 voltage d-q conversion unit
70 AVR model unit
80 governor and driving source model unit
90 power generation torque damping unit
100, 110 voltage limiting unit
120 current limiting unit
130 equivalent circuit of rotation angle variation feedback path

The invention claimed is:

1. A power converter comprising:
a power conversion unit configured to convert DC power inputted thereto into AC power, and output the AC power to an output line connected to a power system; and
a control unit configured to control the power conversion unit such that the power conversion unit operates as a virtual synchronous generator, wherein
the control unit includes:
  an AVR model unit configured to perform arithmetic operation, based on reactive power and an output voltage that are outputted from the power conversion unit to the output line, a reactive power command value, and a voltage command value, to obtain an induced voltage of the virtual synchronous generator in accordance with a deviation of the output voltage from the voltage command value;
  a governor and driving source model unit configured to perform arithmetic operation, based on active power outputted from the power conversion unit to the output line, an active power command value, an angular velocity command value, and an angular velocity of a rotor of the virtual synchronous generator, to obtain a driving torque of a virtual driving source in accordance with a deviation of the angular velocity from the angular velocity command value, the virtual driving source driving the virtual synchronous generator;
  a power generation torque arithmetic operation unit configured to perform arithmetic operation, based on the induced voltage obtained through the arithmetic operation by the AVR model unit and either a q-axis current command value or a q-axis component of an output current of the power conversion unit, to obtain a power generation torque of the virtual synchronous generator;
  a rotation angle arithmetic operation unit configured to perform arithmetic operation to obtain an acceleration torque of the rotor of the virtual synchronous generator in a manner to subtract the power generation torque obtained through the arithmetic operation by the power generation torque arithmetic operation unit from the driving torque obtained through the arithmetic operation by the governor and driving source model unit, and perform arithmetic operation based on at least the acceleration torque and inertia of the rotor of the virtual synchronous generator to obtain the angular velocity and a rotation angle of the rotor of the virtual synchronous generator;
  a voltage d-q conversion unit configured to perform arithmetic operation, with use of the rotation angle obtained through the arithmetic operation by the rotation angle arithmetic operation unit, to obtain a d-axis component and a q-axis component of an output voltage of the power conversion unit;
  a generator model unit configured to perform arithmetic operation, with use of an algebraic expression that is specified by a phasor diagram representing a relationship among an induced voltage, a phase voltage, and a line current of a synchronous generator, and based on the induced voltage obtained through the arithmetic operation by the AVR model unit and the d-axis component and the q-axis component of the output voltage obtained through the arithmetic operation by the d-q conversion unit, to obtain a d-axis current command value and the q-axis current command value corresponding to a d-axis component and a q-axis component of an armature current of the virtual synchronous generator; and
  a power conversion control unit configured to control the power conversion unit to output a current corresponding to the d-axis current command value and the q-axis current command value obtained through the arithmetic operation by the generator model unit.

2. The power converter according to claim 1, wherein the control unit further includes a power generation torque damping unit configured to damp a vibration of the power generation torque obtained through the arithmetic operation by the power generation torque arithmetic operation unit, and output the power generation torque to the rotation angle arithmetic operation unit.

3. The power converter according to claim 1, wherein the control unit further includes a voltage limiting unit configured to limit values of the d-axis component and the q-axis component of the output voltage, which are fed to the generator model unit via the voltage d-q conversion unit, to predetermined values.

4. The power converter according to claim 1, wherein the control unit further includes a current limiting control unit configured to perform control to limit the d-axis and q-axis current command values obtained through the arithmetic operation by the generator model unit to be within a predetermined range.

* * * * *